United States Patent [19]

Borchard et al.

[11] Patent Number: 4,515,843
[45] Date of Patent: May 7, 1985

[54] DISC-SHAPED INFORMATION CARRIER HAVING A HIGH STORAGE DENSITY

[75] Inventors: Heinz Borchard, Nortorf; Herbert Knothe, Neumünster; Bruno Rybka, Nortorf, all of Fed. Rep. of Germany

[73] Assignee: Teldec Telefunken-Decca Schallplatten GmbH, Hamburg, Fed. Rep. of Germany

[21] Appl. No.: 32,480

[22] Filed: Apr. 23, 1979

[30] Foreign Application Priority Data

Apr. 27, 1978 [DE] Fed. Rep. of Germany ....... 2818490

[51] Int. Cl.³ .................... B29D 17/00; B32B 3/02; G06K 19/02; G11B 23/00
[52] U.S. Cl. .................................... 428/64; 369/288; 428/65; 523/174
[58] Field of Search ............. 260/23 XA, 42, 49, 344; 428/64, 65; 523/174; 369/288

[56] References Cited

U.S. PATENT DOCUMENTS 4,071,490 1/1978 Andraschek et al. ............... 526/330

Primary Examiner—James C. Cannon
Attorney, Agent, or Firm—Spencer & Frank

[57] ABSTRACT

A disc-shaped information carrier produced by thermoplastic deformation comprising a pressed mass including a co-polymer of vinyl chloride having additives incorporated therein. The carrier has hygroscopic properties and relief-like surface portions which are sufficiently yielding to permit pressure scanning.

5 Claims, 2 Drawing Figures

DISC-SHAPED INFORMATION CARRIER HAVING A HIGH STORAGE DENSITY

BACKGROUND OF THE INVENTION

The present invention relates to a disc-shaped information carrier produced by means of thermoplastic deformation. The information carrier is used for the atorage of audio and video signals which are to be scanned in accordance with the pressure scanning method.

A system for pressure scanning signals, including television signals, from an information carrier is disclosed in U.S. Pat. No. 3,652,809 granted Mar. 28, 1972 to Dickopp et al. Also, a signal playback system including a record carrier with mechanical deformations which are mechanically scanned by a pickup and converted to electrical signals is described in German Offenlegungsschrift No. 25 25 369. In this latter system, the angle of inclination of the pickup with respect to the record carrier is modulated in accordance with the mechanically recorded signal thereby requiring a record carrier which is absolutely rigid. Moreover, this scanning system requires a pickup which is movable about its transverse axis so as to be able to follow the raised portions in the record with a tilting mevement.

It is known to fabricate information carriers having high storage density from flexible hard polyvinyl chloride foils. German Patent Application No. P 25 40 654 discloses an improvement in such carriers for use with the mechanical pressure scanning method by making them of a homopolymer in a stamping process and then rotating the carrier in the form of a flexible foil on a cushion of air. The cushion of air with its special saddle plate compensates for unavoidable unevennesses in the stamped foil during rotation thereby reducing the wobble of the rotating foil against the pickup.

Information carriers according to U.S. Pat. No. 3,652,809 are played back at 1500 rpm. With a groove width of 3.6 microns and a disc diameter of 21 cm, they permit storage of a video program having a duration of up to 10 minutes. Due to the precision obtained during stamping of the recording grooves or relief, this arrangement produces a satisfactory and useful signal in the pickup. However, with further reduction of the relief dimensions, no precise reproduction is possible with conventional materials and the pickup no longer produces an acceptable signal.

In order to reduce friction during playback, the stamped carrier can be coated as taught in German Offenlegungsschrift No. 2 545 445. However, the length of time during which such coatings remain effective is not entirely satisfactory and complicated and difficult production technology is required. The difficulties increase with decreasing relief dimensions since "flattening" of the stamped relief can result in loss of pulses.

It is an object of the invention to provide conditions for an extended playing period of the information carrier without having to increase its diameter. This requires reduction of the playback speed and the groove width; i.e. reduction of the relief dimensions.

It is a further object of the invention to provide a material which permits the reduced relief dimensions to be shaped with precision and which keeps the sliding friction between the pickup and the disc surface at a constant low level.

SUMMARY OF THE INVENTION

According to the invention, the information carrier is advantageously produced of a pressed mass comprising a co-polymer such as vinyl chloride and vinyl acetate. The copolymer permits better viscous deformation and consequently more precise pressing so that peak spacing and groove width of the signal recording can be reduced. Additivies are incorporated in the mixed compound during the pressing process to form a surface having hygroscopic properties thereby producing a rigid information carrier with relief-like surface portions that are sufficiently yielding to permit use of pressure scanning. These additives include partial esters of glycerin in combination with amino fatty acid esters with epoxide groups.

In a further feature of the invention, reduction of the peak spacing and thus of the spacing of the signal elements in the groove track results in a reduction of the playback speed and longer playing time.

DESCRIPTION OF THE PREFERRED EMBODIMENTS

Figure 1:
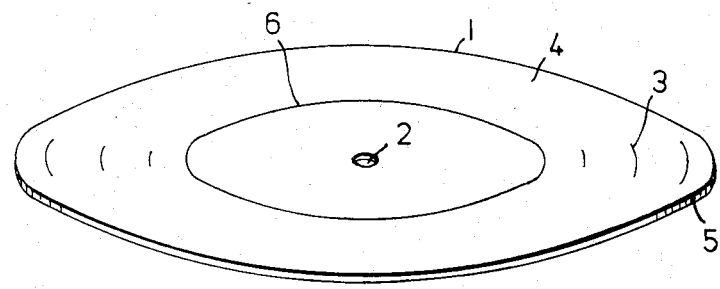
FIG. 1 shows a disc-shaped information carrier.

Referring to FIG. 1, there is illustrated a disc-shaped information carrier or record 1 having a center hole 2 for mounting the carrier on a turntable (not shown) for rotation about its axis. Grooves 3 are disposed in the surface 4 of the carrier between the outer edge 5 and a circular inner edge 6. Audio and/or video signals in the form of raised portions and depressions are impressed on the surface of the carrier and read-out by a pickup (not shown) positioned above the carrier 1.

Figure 2:
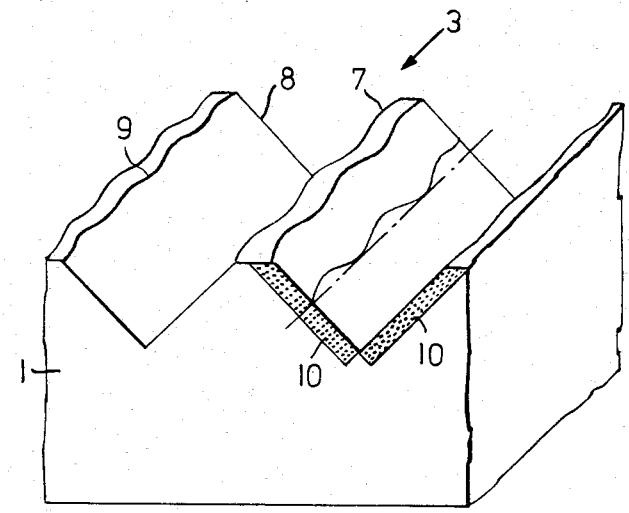
FIG. 2 shows an enlarged view of a portion of the information carrier of FIG. 1.

FIG. 2 shows an enlarged portion of the carrier 1 of FIG. 1 showing details of the grooves 3. In the carrier illustrated, the two sides 7 and 8 of each groove are provided with deformations 9 in the form of wave trains formed by the well-known technique of vertical recording. The portion of the carrier at the surface of the groove, which takes part in the elastic deformation during playback, is indicated by the cross-latched layers 10, as explained in the aforesaid U.S. Pat. No. 3,652,809.

In accordance with the present invention, an information carrier capable of storing considerably more information than earlier carriers can be manufactured by pressing a composition comprising mixed polymers of vinyl compounds and additives which during the pressing process form a surface having hygroscopic properties. Copolymers which can be used include:

83–90% vinyl chloride
10–17% vinyl acetate
with a preferable K-value of 49–50

Suitable additives are:

In addition to the normal stabilizing system as described in German Patent No. 17 19 233, in accordance with the present application: amino fatty acid ester with epoxide groups, glycerin partial ester In one embodiment of the invention, between 93.29 and 96.29 percent copolymerisate of vinyl chloride and vinyl acetate and the balance additives including 0.5 to 1.5 percent partial esters of glycerin in combination with 2 to 4 percent amino fatty acid esters with epoxide groups are formed into an information carrier by the following process, all of the amounts referred to herein being percents by weight.

The carrier is produced under the same conditions and principles as a usual phonograph record.

The stampers are mounted an two molds which are heated with steam to a temperature of maximum 150° C. for the molding process.

The molding process is performed under a pressure of more than 120 kp/cm$^2$.

The subsequent cooling process is done by shooting water through the channels in the mold.

The pressing of an especially fine surface relief with such low temperature is achieved by using a copolymer with 10–17% acetate.

Under these molding process conditions it is possible with the help of the incorporated additives to produce a surface of hygroscopic attributes which is noticable by a reduced surface resistance.

Normally on PVC-surfaces a resistance more than $10^{14}$ Ω is measured.

In the case of this invention however, the surface resistance on produced records was lower than $10^{12}$ Ω.

Because the additives are highly soluble in polyvinyl chloride, an optimum surface quality is produced during the thermoplastic shaping of the carrier grooves resulting in substantial reduction in the sliding friction between the carrier surface and the pick up.

A preferred composition for the disc-shaped information carrier 1 consists of the following:
copolymer consisting of 87.0 weight percent vinyl chloride and 13.0 weight percent vinyl acetate: 94.79
aminocrotonic ester: 0.85
calcium stearate: 0.30
carbon black: 0.06
amino fatty acid ester with epoxide groups: 3.0
glycerin partial ester: 1.0

In this preferred composition, the aminocrotonic ester, calcium stearate and carbon black acts as a stabilizer and the amino fatty acid ester with epoxide groups as a lubricant or slide system.

As already discussed, conventional discs having a diameter of 21 cm made in accordance with the U.S. Pat. No. 3,652,809 generally have a groove width of 3.6 microns, are rotated at 1500 rpm and can store up to 10 minutes of video information. In contrast, a 21 cm disc made in accordance with the teachings of the present invention can have a groove width of 2 microns, rotate at only 500 rpm and store up to 45 minutes of video information. The peak relief of the disc with a smallest distance from peak to peak of less than 1 micron can be viscously reproduced.

An information carrier intended exclusively for the storage of audio signals can be fabricated with a diameter of, for example, 125 mm in such a way that an hour's playing time is obtained on each side with a peripheral playback speed of less than 3 m/sec. With the number of revolutions reduced in this way, a cushion of air is no longer required and a rigid record can be pressed and played back. Also, the need for a foil material having antistatic properties is eliminated together with the technically difficult process of producing such a foil.

The surface of the information carrier disc is sufficiently hygroscopic to produce permanently very low friction between the pickup and disc surface due to the migration of the additive toward the surface. This eliminates the need for coating with antifriction means which is extremely difficult to perform with very small relief dimensions.

The present invention provides an information carrier in the form of a rigid disc rather than a foil [floppy disc] and permits more favorable selection and incorporation of additives due to changes in processing techniques. As explained above, the entire preparation process does not include any process steps requiring temperatures above 150° C. as is required for calendering in the production of a floppy disc. The unfavorable reactions which occur at higher temperatures between stabilizers and antistatic agents are eliminated. Moreover, the adverse influence on thermal stability usually encountered at processing temperatures below 150° C. is substantially reduced.

It will be understood that the above description of the present invention is susceptible to various modifications, changes and adaptations, and the same are intended to be comprehended within the meaning and range of equivalents of the appended claims.

What is claimed is:

1. A rigid disc-shaped information carrier produced by thermoplastic deformation comprising a pressed mass including a co-polymer of vinyl chloride having additives incorporated therein, said additives comprising a stabilizer system comprised of amino crotonic ester, calcium stearate, and carbon black and a lubricant system comprised of partial esters of glycerin in combination with amino fatty acid esters with epoxide groups, a rigid disc information carrier being thereby produced having hygroscopic properties and relief-like surface portions which are sufficiently yielding to permit pressure scanning.

2. An information carrier as defined by claim 1 wherein said co-polymer consists essentially of vinyl chloride and vinyl acetate.

3. An information carrier as defined by claim 1 wherein said pressed mass consists essentially of 93.29 to 96.29 weight percent copolymer and 3.71 to 6.71 weight percent additive, said additive being composed of approximately 1.21 percent of a stabilizer system, and 4 percent lubricant.

4. An information carrier as defined by claim 3 wherein said stabilizer consists essentially of aminocrotonic ester, calcium stearate and carbon black, and wherein said lubricant consists essentially of approximately 3 weight percent amino fatty acid ester with epoxide groups and 1 weight percent glycerin partial ester.

5. A rigid disc shaped information carrier according to any one of claims 1, 2, 3, or 4, wherein the mass is molded at a maximum temperature of 150° C.

* * * * *